United States Patent [19]
Campau

[11] Patent Number: 5,181,540
[45] Date of Patent: Jan. 26, 1993

[54] ELECTRIC MULTI-POINT POSITIONER

[75] Inventor: Daniel N. Campau, Grand Rapids, Mich.

[73] Assignee: Flow-Rite Controls, Ltd., Grand Rapids, Mich.

[21] Appl. No.: 861,297

[22] Filed: Mar. 31, 1992

Related U.S. Application Data

[62] Division of Ser. No. 723,754, Jul. 1, 1991.

[51] Int. Cl.$^5$ ............................................. A16K 5/00
[52] U.S. Cl. ............................ 137/625.46; 251/129.11
[58] Field of Search ........ 318/265, 601, 602, 280–286, 318/443, 444, 652; 340/870.37, 870.33, 870.19, 679.68 D, 686, 672; 324/207.13, 207.23, 207.25; 74/816, 817, 826, 827, 813 R; 137/512, 625.46; 251/304, 129.11

[56] References Cited

U.S. PATENT DOCUMENTS

| | | | |
|---|---|---|---|
| 4,589,441 | 5/1986 | Campau | 137/512 |
| 4,708,084 | 11/1987 | Campau | 137/512 X |
| 4,948,095 | 8/1990 | Campau | 251/304 X |
| 5,010,836 | 4/1991 | Riviezzo | 251/304 X |

Primary Examiner—John C. Fox
Attorney, Agent, or Firm—Niro, Scavone, Haller & Niro

[57] ABSTRACT

An apparatus having a variety of applications is provided for indexing a rotary component. The apparatus of the present invention includes a housing, a resilient electrically conductive band contained within the housing and connected to the rotary component, at least two indexing electrical contacts located on the housing internal periphery and is slidable contact with the band, and a bridging electrical contact electrically connected to the band while the band rotates. The band exerts a biasing force on the housing, thereby mainaining band contact with the housing internal periphery, while also causing a point of separation of the band from the housing. Drive means is provided for rotating the band within the housing. Finally, electrical circuit means, including electrical supply means and switching means, are provided for selecting one indexing contact and applying power through the drive means to rotate the band and the rotary component until the band disengages from the selected indexing contact, thus halting further movement of the band and rotary component.

8 Claims, 2 Drawing Sheets

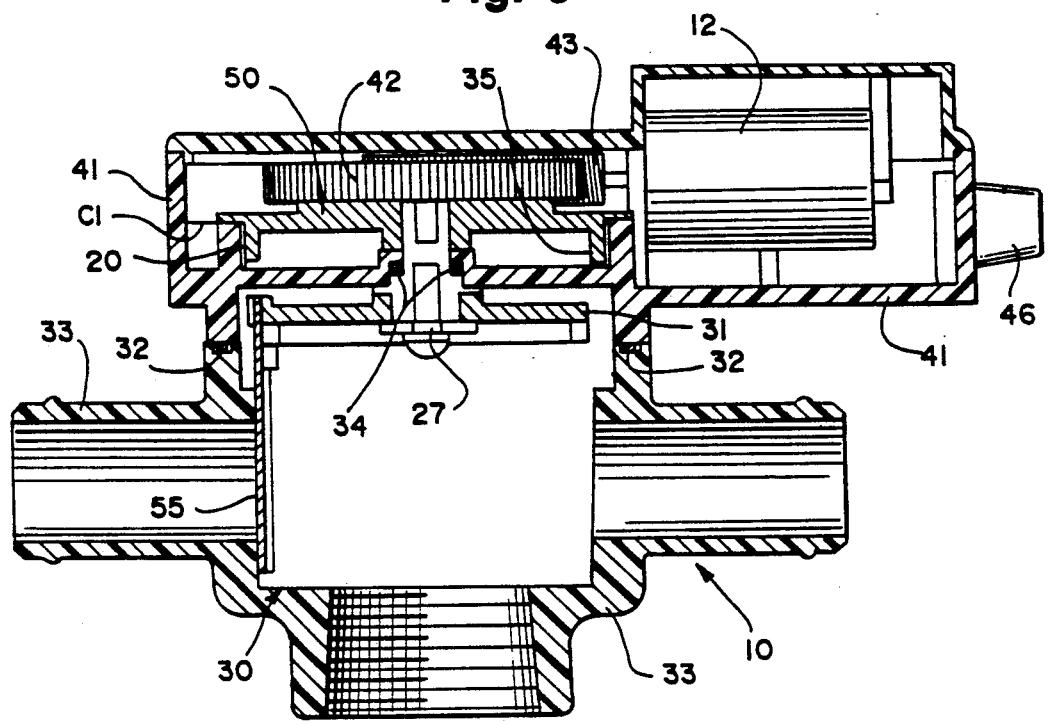
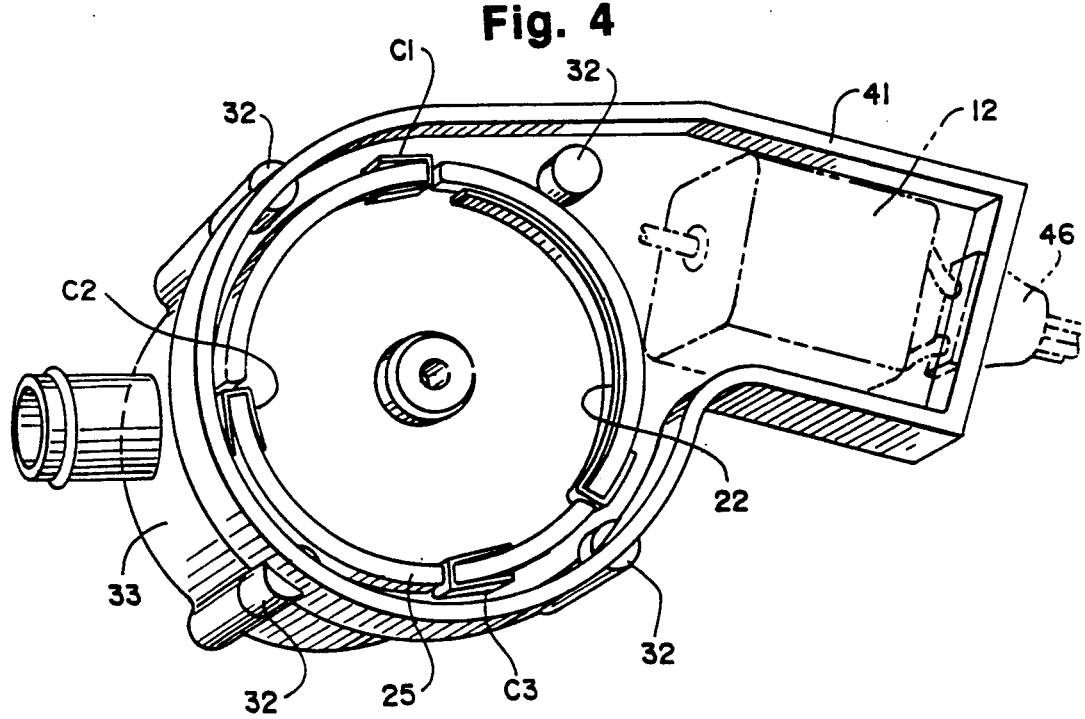

ELECTRIC MULTI-POINT POSITIONER

This is a divisional of copending 07/723754 filed on Jul. 1, 1991.

BACKGROUND OF THE INVENTION

U.S. Pat. Nos. 4,708,084 and 4,948,095 as well as Ser. No. 07/713,626, are hereby incorporated by reference into this disclosure.

The present invention relates generally to electrically controlled devices for multi-point positioning. The present invention relates more specifically to electrically controlled multi-point positioners which can selectively control a rotating means, thus allowing operator-controlled selection for a number of applications, including the use of a multi-point valve positioner in a water distribution system which is in communication between a reservoir and a lake.

The water distribution systems disclosed in U.S. Pat. Nos. 4,589,441, 4,708,084 and 4,948,095 represent typical prior art apparatus for controlling the flow of water between a livewell and an external water source. These systems are used widely by many manufacturers of sport fishing boats. They achieve various advantages such as the use of a single pump to both fill the livewell and recirculate livewell water through the system's aeration device and the ability, when the boat is running, to automatically prevent loss of livewell water out the drain port, while continuing to draw water from the livewell drain for recirculation and aeration. Further advantages are found in copending Ser. No. 07/713,626. This application discloses a remote control valve that will fill, recirculate and drain a livewell/baitwell contained within a fishing boat, utilizing a mechanically actuated push-pull cable means. Valve stem extension means are also utilized in the prior art for mechanical actuation of such control valves. Such mechanically actuated control valve means are very convenient for fishermen, and are now widely used on boats in tournament style fishing.

However, mechanically actuated control valves do suffer from certain disadvantages. For example, as regards the application to fishing boats, mechanical actuation means are expensive to install, requiring considerable time and skilled labor. If not rigged precisely, they can fail to position the valve properly. Also, since most boats are now "foamed" in (i.e., foam is sprayed directly onto the boat, hardening and conforming to the boat surface), push-pull cable control means must be installed at the time of manufacture of the boats. Moreover, this exothermic foam curing process can generate enough heat to cause the control cable plastic jacket to soften, leading to unacceptably high cable friction and actuator force. The foaming process also limits the market for livewell control systems utilizing manually actuated control systems to new boats, since retrofit is impractical.

It would therefore be desireable to provide an inexpensive valve positioner which would eliminate the problems associated with the push-pull control cable disclosed in co-pending Ser. No. 07/713,626, while retaining the advantages disclosed in that application. However, conventional switch contact means, such as magnetic reed switches, electronic proximity switches, mechanical snap-action switches, and optical or conventional rotary mechanical wiper type switches, all require precise alignment for proper valve positioning. Thus, deflections in the sealing glands or o-rings, due to varying loads which can cause rotor wobble, must be prevented in order for these types of switch contact means to function properly; a failure to prevent such deflections could introduce positioning error or failure of the switch "make or break" function. Also, the switch mechanism must be shock resistant since it could sit on the floor of a high speed tournament fishing boat operating for extended periods in rough water.

Further, conventional ball and plug type valves have a variable break-free torque depending on idle time and temperature; reaction loads to such torques are high and require a relatively heavy structure to maintain the precise alignment of parts required for proper valve operation. Variable torques can also cause operating speed variations that can affect positioning accuracy, necessitating higher gear reduction drive systems to eliminate coasting during low torque cycles.

SUMMARY OF THE INVENTION

There is therefore a need for a submersible electrically controlled multi-point valve positioner for operatively controlling a water distribution system in communication between a reservoir, such as a livewell on a fishing boat, and a water source, such as a lake or river. The valve positioner for use in livewell control applications must be submersible, economical and must operate on low (12 volt) direct current. Moreover, such a valve positioner must be extremely durable, capable of operating for thousands of cycles without servicing (especially since such mechanisms are often hermetically sealed in their housings). Preferably, it would also not consume power when not being used. Conventional valve/positioner combinations fail to meet one or more of these requirements.

The valves disclosed in U.S. Pat. Nos. 4,589,441, 4,708,084 and 4,948,095, as well as co-pending U.S. Ser. No. 07/713,626, are especially suitable for electric motor drive positioning applications because they require a low actuation torque which remains constant, even after long periods of idle or wide temperature variation. The use of a small, economical 12 volt, direct current permanent magnet motor has been found to be especially useful in such applications. Also, adequate speed reduction can be obtained by utilizing a simple worm and gear drive system.

For example, the multi-point positioner of the present invention can be used to rotate flappers positioned within an annular valve to various predetermined positions (e.g., ports) along the valve periphery. As another example, the multi-point positioner can be used to signal devices to perform certain functions. Applications can be easily envisioned for such diverse devices as chemical apportioning and mixing devices, multi-color spray-paint dispensers, selective food mixers, etc. In short, any devices which require reliable, fast switching means may utilize the present invention.

The present invention is designed to maintain all the advantages of the water distribution systems described in U.S. Pat. Nos. 4,589,441, 4,948,095 and 4,708,084, while overcoming the disadvantages already generally described. The invention can also be applied to a variety of other technical areas, as mentioned above, and should be viewed in light of those applications as well.

An object, therefore, of the present invention is to provide an electrically actuated multi-point valve positioner for controlling a water distribution system which directs the flow of water between a livewell and a water source and which, in addition to the operational modes described in U.S. Pat. No. 4,589,441 and 4,708,084, can operate in a "recirculate-only" mode in a boat that is either still or moving at a slow speed, as further explained in co-pending Ser. No. 07/713,626.

A second object of the present invention is to provide a valve positioner of the character described which will overcome the effect of pressure oscillations in the drain line and resist the small suction created by the pump to provide drip-tight sealing in the livewell's transom drain line.

A third object of the present invention is to provide the valve positioner operator with reliable means for quickly, easily and properly positioning the valve in any one of a plurality of positions.

A fourth object of the present invention is to provide an electric multi-point positioner for indexing a rotary component which can be utilized in any number of applications, including any devices which require reliable, fast switching means and can be actuated by rotational means.

These objects are achieved by the present invention, an apparatus for indexing a rotary component. The apparatus includes a housing having a sidewall with an internal periphery, to which a plurality of indexing electrical contacts are mounted, with the contacts being spaced circumferentially around the housing internal periphery. A rotatable, electrically conductive, annular band is also provided and is contained within the housing, and connected to the rotary component. The band has a first portion which slidably engages the indexing contacts, and a second portion which does not engage the indexing contacts. At least one bridging electrical contact is also provided, and remains in electrical engagement with the band while the band rotates. A drive means rotates the band within the housing. Finally, electrical circuit means is provided, and includes an electrical supply means and switching means, for selecting one indexing contact and applying power through the drive means to rotate the band, and thus the rotary component, until the band disengages from the selected indexing contact, thereby simultaneously halting further movement of the rotary component.

In another embodiment, the indexing contacts have biasing means for urging the band into slidable contact with the indexing contacts.

In a further embodiment, the band is of a dimension greater than the housing internal periphery, thereby causing elastic buckling of the band such that the first band portion is generally convex and the second band portion is smaller and generally concave. Also, the band is resilient, and the housing is cylindrical.

In a still further embodiment, the drive means includes a motor and a gear driven by the motor.

In another embodiment, power amplifying means is provided, thus allowing the control of higher torques.

In yet another embodiment, the apparatus includes a rotating guide positioned adjacent to and in operative connection with the internal periphery of the band. The rotating guide is operatively connected to the drive means, and also maintains the band in a general annular location between the exterior periphery of the rotating guide and the housing internal periphery.

In a preferred embodiment, an apparatus is provided for indexing a rotary component which controls the rotation of one or more flexible sealing flappers adapted to seal one or more ports within a multi-port valve, for use in a water distribution system between a water source and a livewell in a boat.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the FIGURES and in which:

FIG. 3 is an exploded side cross-sectional of the electric multi-point positioner, valve, gear, motor and worm gear of the present invention, of the character described in FIG. 1;

FIG. 4 is a perspective planar view of the embodiment disclosed in FIG. 3.

DETAILED DESCRIPTION OF THE INVENTION

The electric multi-point positioner of the present invention will be described in detail with reference to the particular application of a valve positioner for operatively controlling a water distribution system for directing the flow of water between a reservoir, such as a livewell on a fishing boat, and a water source, such as a lake or river, such as described in U.S. Pat. No. 4,708,084 and co-pending Ser. No. 07/713,626. Of course, it must be understood that a variety of other applications for the present invention can be envisioned, as mentioned above.

The valve construction for the valve referred to below is similar to the valve with two one-way flappers disclosed in U.S. Pat. No. 4,948,095, except that the valve rotor of the present invention is free to rotate 360°. As will be understood after reading this description, only a single one-way flapper need be used with the valve described in U.S. Pat. Nos. 4,589,441 and 4,708,084 (a flapper which will rotate between two positions which are 180° apart), while only two one-way flappers (one of them spring-loaded) need be used with co-pending Ser. No. 07/713,626 (the flappers being spaced 90° apart). The electric positioner of the present invention eliminates the need for the detent and compound linkage actuation mechanisms disclosed in Ser. No. 07/713,626, as well as the push-pull valve control disclosed in that application and U.S. Pat. Nos. 4,589,441 and 4,708,084.

Figure 1:
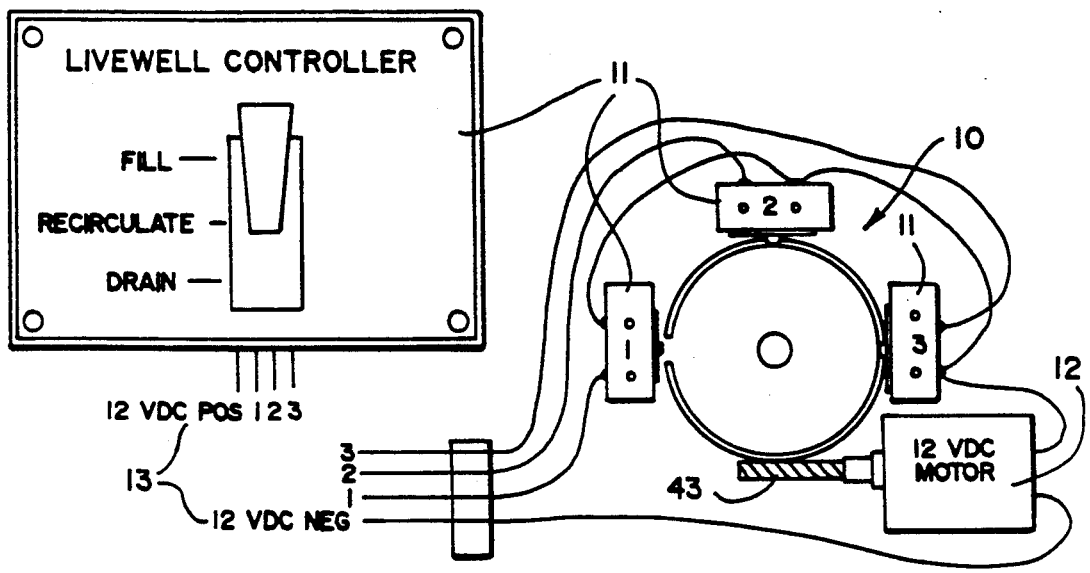
FIG. 1 is a schematic view of one embodiment of the electric multi-point positioner of the present invention, used in livewell applications with a rotatable valve (not shown) as discussed above, suitable electric switching means, and motor with connecting worm gear.

The preferred embodiment of the present invention enables electrical control of a rotatable valve means positioned within a valve, which allows the directing of a flow of water between a water source, such as a lake or river, and a reservoir, such as a livewell which is used on fishing vessels for oxygenating water and recirculating it. Referring to the drawings in greater detail, the invention can be seen in schematic or diagrammatic detail in FIG. 1, in which the electric multi-point valve positioner, generally designated as 10, is shown, together with suitable electric switching means 11, and a small motor 12 with connecting worm gear 43. When an operator positions the switching means in position "1", for example, current (provided by an external electrical supply means, such as battery 13) runs through the wires to the motor and to box "1", but not through boxes "2" or "3". (Indexing electrical contacts C1, C2 and C3, described below, are pictorially represented as electrically communicating with switching means 11 by boxes "1", "2" and "3", respectively, in FIG. 1.)

Figure 2:
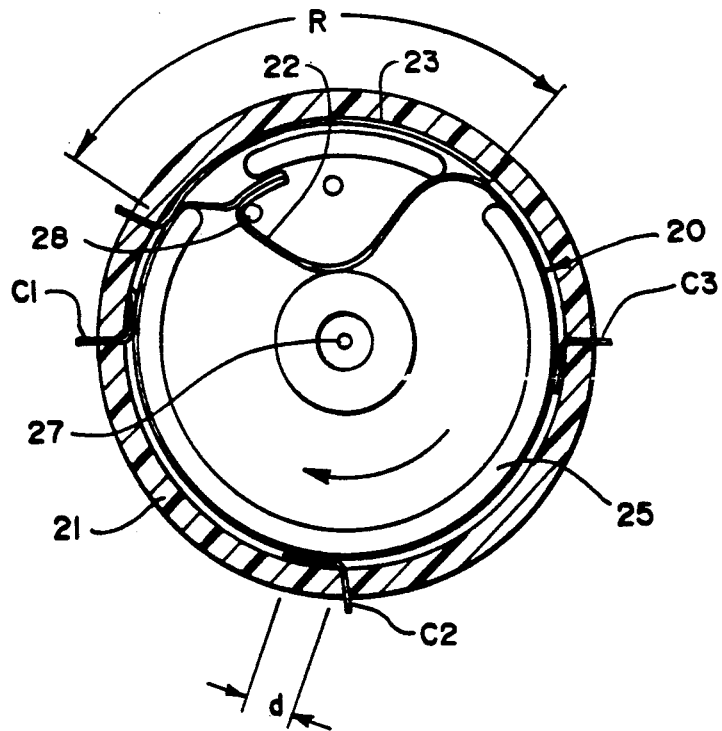
FIG. 2 is an exploded cross-sectional planar view of a portion of the electric multi-point positioner which is housed within the valve, of the character described in FIG. 1.

FIG. 2 shows the portion of the electric multi-point valve positioner of the present invention which is housed above the valve chamber. Annular cylinder wall 21 contains a generally circular, rotating guiding means 25, which is connected by valve stem 27 to valve rotor 31. A stressed flexible or "buckled" band 20 is housed between wall 21 and guiding means 25. Band 20 is made of a suitable metal, electrically conductive band. It has been found that for the particular application of an electrical positioner for use in rotating flapper to selectively engage ports within a multiport valve, given the typical valve size (about a 2" diameter) the band thickness is preferably about 0.002". Of course, this thickness will vary for a given application. It has been found that a suitably resilient metal band with a diameter of 2 inches, for example, when fitted within a cylinder having a diameter of 1.95 inches, will buckle elastically into the generally convex shape shown in FIG. 2, forming a smaller non-circular and concave portion 22. Electrical, generally L-shaped metal "indexing" contacts C1, C2 and C3 are provided in spaced relation as shown. These indexing contacts can be biased to maintain contact with the flexible band, allowing the rotating band to provide a wiping action against the indexing contacts, thus helping to keep the contacts clean and free from debris. The biased indexing contacts C1, C2 and C3 and guiding means 25 also cooperate to prevent the band from tracking away from annular wall 21. An extended-length arcuate "bridging" metal contact 23 is also shown, having an arcuate length "R". The length "d" represents the contact length along the arcuate band for indexing contacts C1, C2 and C3. Rotating guiding means 25 is in constant frictional and slidable contact with buckled band 20; thus, as the guiding means rotates, it causes the band to rotate as well. Should the band be rotated in the wrong direction, pin 28 will prevent damage to the band.

Virtually any number of electrical contacts can be used in other applications, provided that the contact circumferential span is set so that only one contact is open at any time. This requires that the distance "d" or contact length be greater than the distance R minus the minimum circumferential travel (i.e., the distance from the trailing edge of one contact to the trailing edge of the next contact) of the band. This assures that only one contact will be open (i.e., not in contact with the band) at any time. Minimum arcuate travel is established by the number of indexing positions required for the application. This determines the arcuate span between the trailing edge points of the contacts. Contact length "d" must be long enough so that the open span of the band cannot bridge two contacts. Since only one contact can be open at a time, the distance between the trailing edge of one contact and the leading edge of the next contact must be less than R. Thus, before the band breaks contact with the powered contact, it must make contact with all other indexing contacts (a "make before break" function).

Referring now to FIG. 3, a side view of the preferred embodiment is shown. Power housing 41 contains the electric multipoint valve positioner 10 (including the flexible band 20 and contacts as described above), as well as the motor 12, gear wheel 42, and worm gear 43 which engages the gear wheel 42. Power housing 41 is connected by o-ring 32 to valve housing 33. Valve 30 includes valve rotor 31; o-ring 34 surrounds valve stem 27 and is thus operatively connected to rotating guide means 35. One or more flexible sealing flappers 55 are connected to valve rotor 31, and adapted to seal one or more of the valve ports. Valve stem 27 can tilt slightly vertically, since valve rotor 31 can be slightly horizontally flexed within valve 30. Elastomeric grommet 46 houses the wiring (not shown) which leads from the positioner to the switching means and external electrical supply means.

FIG. 4 is an end view of FIG. 3, showing a portion of the positioner of the present invention, as well as the power housing 41, and its connection to valve housing 33 by o-rings 32. A boss (not shown) is attached to the interior of power housing 41 and provides a convenient seat whereby motor 12 is securely positioned within power housing 41, enabling continual accurate alignment with gear wheel 42. This accurate alignment allows gear wheel 42 and worm gear 43 to cooperate with the motor to cause the band to rotate without coasting of gear wheel 42.

The particular operation of the electric multi-point valve positioner of the present invention will now be described. In the rest or de-energized ("open") circuit position, the operator selects, for example, position "2" on switching means 11. A closed or energized circuit now exists: one leg of the circuit runs from motor 12 to the negative end of battery 13, while the other leg runs from motor 12 to C2 (represented by box "2" in FIG. 1) to the positive end of battery 13. Current will always be able to run from motor 12 through one of indexing contacts C1, C2 or C3, since bridging contact 23 is of a sufficient length R so that it bridges non-circular or concave portion 22 of flexible band 20.

This closed circuit causes the motor to drive worm gear 43, and thus gear wheel 42. In the preferred embodiment, gear wheel 42 is rigidly mounted on the opposite face of the annular element 50 which includes rotating guide 25. Annular element 50, in turn, is operatively connected to valve rotor 32 through valve stem 27. Therefore, in response to the rotation of gear wheel 42, valve rotor 32 will rotate. Valve rotor 32 in turn causes rotation of the flappers within valve 30 (not shown), which are operatively connected to valve rotor 32. The flappers, together with valve rotor 32, will continue to rotate until the non-circular portion 22 of the flexible band 20 is positioned over contact C2. Now, with the conductive band no longer electrically connected to indexing contact C2, the circuit is now open or de-energized (i.e., the positive end of battery 13 is no longer in electrical communication with the motor, since switching means 11 is no longer in communication with the motor through indexing contact C2). Accordingly, power is cut to the motor and rotation is immediately ceased through the stopping action of worm gear 43. While the motor is off and the circuit is open, no power is consumed.

The electric valve positioner of the present invention will tolerate wobble in the rotor, which can be caused by contact of the spring-loaded flapper (if present) on the valve wall, thereby exerting a varying bending load on the center valve stem 27. O-ring 34 and valve stem 27 can flex, as described above, so that the actuation torque is nearly constant despite the varying load exerted on valve stem 27. Also, since the band and band guide can move vertically relative to each other, the tilt or wobble in the rotor and band guide has a minimal effect on the position of the band in relationship to the electrical contacts.

Accordingly, with the two one-way flappers described above positioned 90° away from each other, the three positions mentioned in co-pending Ser. No. 07/713,626, the "recirculate-only" position, the "dual-fill-and-recirculate" position, and the "empty" position, can each be selectively achieved by the operator.

Motor 12 is, of course, not limited to a 12-volt, direct current permanent-magnet motor. While livewell applications only require a small motor that operates on 0.15 amps at 12-volt direct current, other applications may require more power. In such applications, power amplifying means, such as a relay between the electrical switching means and a larger motor, can be used which allows a higher torque (and higher electrical loads) to be controlled.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

What is claimed is:

1. An apparatus for indexing a rotary component which controls the rotation of one or more flexible sealing flappers adapted to seal one or more ports within a multi-port valve, for use in a water distribution system between a water source and a livewell in a boat, the valve including a valve chamber defined by a top wall, a bottom wall, a cylindrical sidewall and two or more ports communicating with the chamber, comprising:
   (a) a housing having a sidewall defining an internal periphery, said housing sidewall supporting a plurality of indexing electrical contacts spaced circumferentially around said internal periphery;
   (b) a rotatable, electrically conductive, annular band contained within said housing and operatively connected to the rotary component, said band being configured to have a first band portion which slidably engages said indexing contacts and a second band portion which is not engageable with said indexing contacts;
   (c) at least one bridging electrical contact adapted to remain in electrical engagement with said band throughout the rotation of said band;
   (d) electrically actuated drive means for rotating said band within said housing; and
   (e) electrical circuit means, including an electrical supply means and switching means, for selecting one indexing contact and applying power through said drive means to rotate said band and the rotary component until said band disengages from the selected one of said indexing contacts, thereby simultaneously halting further movement of the rotary component.

2. The apparatus of claim 1, further comprising biasing means for urging said first band portion toward said housing internal periphery and into slidable contact with said plurality of electrical indexing contacts.

3. The apparatus of claim 1, wherein said band is of a dimension greater than the internal periphery of said housing, thereby causing elastic buckling of said band such that said first portion is generally convex and said second portion is smaller and generally concave.

4. The apparatus of claim 1, wherein said band is resilient, said housing is cylindrical, and said drive means includes a motor and a gear driven by said motor.

5. The apparatus of claim 1, further comprising a rotating guide positioned adjacent to and in operative connection with the internal periphery of said band, said rotating guide being operatively connected to said drive means and forming an annular cavity with said housing internal periphery wherein said band is free to rotate.

6. The apparatus of claim 1, wherein said indexing electrical contacts are biased to improve engagement with said first band portion.

7. The apparatus of claim 1, wherein the rotary component and said band are flexibly connected, such that any tilt of the rotary component has a minimal effect on the positional relationship of said band and said indexing contacts.

8. The apparatus of claim 1, wherein one or more of the flappers include a biased spring for urging one or more of the flappers into sealing contact with one or more of the ports of the valve chamber.

* * * * *